(12) United States Patent
Demma et al.

(10) Patent No.: US 9,541,049 B2
(45) Date of Patent: Jan. 10, 2017

(54) CABLE-OPERATED ACTUATING DEVICE FOR A MOTOR VEHICLE

(71) Applicant: GM GLOBAL TECHNOLOGY OPERATIONS LLC, Detroit, MI (US)

(72) Inventors: Dino Demma, Ruesselsheim (DE); Dirk Eisinger, Darmstadt (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 892 days.

(21) Appl. No.: 13/746,785

(22) Filed: Jan. 22, 2013

(65) Prior Publication Data

US 2013/0199488 A1 Aug. 8, 2013

(30) Foreign Application Priority Data

Jan. 28, 2012 (DE) .......... 10 2012 001 667

(51) Int. Cl.
*F02N 19/00* (2010.01)
*F16H 61/36* (2006.01)
(Continued)

(52) U.S. Cl.
CPC ............ *F02N 19/001* (2013.01); *F16C 1/102* (2013.01); *F16C 1/14* (2013.01); *F16H 61/36* (2013.01); *Y10T 29/49231* (2015.01)

(58) Field of Classification Search
CPC .............. F16C 1/22; F16C 1/14; F16C 1/102; C16C 1/223; F02N 19/001; F16H 61/36; Y10T 29/49231; Y10T 74/20402; Y10T 74/2045; Y10T 74/20462; G05G 5/22; G05G 5/24
(Continued)

(56) References Cited

U.S. PATENT DOCUMENTS 2,839,912 A * 6/1958 Corbin ................. E05B 83/16
 292/216
5,161,428 A * 11/1992 Petruccello ............ F16C 1/226
 192/111.12
(Continued)

FOREIGN PATENT DOCUMENTS

DE 19825359 A1 12/1999
FR 2776724 A1 10/1999
JP 2006057764 A 3/2006

OTHER PUBLICATIONS

151104 JP 2006-153257A.*
151104 FR 2922614A1.*
151104 JP 2006-57764.*

*Primary Examiner* — Hieu T Vo
*Assistant Examiner* — Carl Staubach
(74) *Attorney, Agent, or Firm* — Lorenz & Kopf LLP

(57) ABSTRACT

The present invention relates to a cable-operated actuating device for a motor vehicle, in particular for a transmission, comprising:
an actuating means having a recess for inserting a coupling connector of a cable control, a blocking means which is radially displaceable in the recess and in a radially outer position permits an axial displacing of the coupling connector in the recess and in a radially inner position axially fixes the coupling connector against an inserting direction in a positively connected and/or frictionally connected manner, a housing, which receives a connecting point between the coupling connector and the recess, and an actuating means for radially displacing the blocking means, which can be actuated outside the housing.

13 Claims, 1 Drawing Sheet

(51) Int. Cl.
*F16C 1/14* (2006.01)
*F16C 1/10* (2006.01)

(58) Field of Classification Search
USPC ............ 123/502.4–502.6, 501.5 R; 74/185.2, 74/185.4, 185.5, 185.6, 185.8, 185.9, 376, 398, 74/406.74, 583
See application file for complete search history.

(56) References Cited

U.S. PATENT DOCUMENTS

| | | | | |
|---|---|---|---|---|
| 5,261,293 A * | 11/1993 | Kelley | ...................... | F16C 1/22 74/502.4 |
| 5,435,202 A * | 7/1995 | Kitamura | ................ | F16C 1/226 403/104 |
| 5,605,074 A * | 2/1997 | Hall | .......................... | F16C 1/14 74/502.4 |
| 5,655,415 A * | 8/1997 | Nagle | ...................... | F16C 1/101 74/501.5 R |
| 5,664,461 A * | 9/1997 | Kitamura | ................ | F16C 1/226 74/501.5 R |
| 5,664,462 A * | 9/1997 | Reasoner | ................ | F16C 1/101 74/502.4 |
| 5,682,797 A * | 11/1997 | Kelley | .................... | F16C 1/226 403/11 |
| 5,706,706 A * | 1/1998 | Kitamura | .................. | F16C 1/14 403/104 |
| 6,116,111 A | 9/2000 | Burger | | |
| 6,247,380 B1 * | 6/2001 | Cebollero | ................ | F16C 1/101 74/501.5 R |
| 6,595,080 B2 * | 7/2003 | Waldow | ..................... | F16C 1/14 403/326 |
| 7,261,328 B2 * | 8/2007 | Minix | ..................... | E05B 13/10 292/28 |
| 7,334,498 B2 * | 2/2008 | Yokomori | ............... | F16C 1/226 254/231 |
| 8,757,675 B2 * | 6/2014 | Loret De Mola | ......... | E05B 5/00 292/140 |
| 9,021,917 B2 * | 5/2015 | Koontz | ..................... | F16C 1/14 74/502.6 |
| 9,038,496 B2 * | 5/2015 | Horinaka | .................. | F16C 1/14 74/500.5 |
| 9,121,439 B2 * | 9/2015 | Schimings | ............... | F16C 1/262 |
| 2006/0230868 A1 * | 10/2006 | Ruhlander | ................ | F16C 1/14 74/501.5 R |
| 2006/0236806 A1 * | 10/2006 | Ruhlander | .............. | F16C 1/226 74/502.6 |
| 2008/0217461 A1 * | 9/2008 | Ruhlander | ................ | F16C 1/14 242/410 |
| 2009/0014302 A1 * | 1/2009 | Meyer | ....................... | F16C 1/10 200/331 |
| 2009/0049947 A1 * | 2/2009 | Horinaka | ................ | F16C 1/14 74/502.4 |
| 2010/0089195 A1 * | 4/2010 | Koontz | ..................... | F16C 1/14 74/501.5 R |
| 2012/0248790 A1 * | 10/2012 | Costabel | ................ | E05B 41/00 292/96 |
| 2014/0169860 A1 * | 6/2014 | Meunier | .................... | F16B 7/04 403/187 |

* cited by examiner

CABLE-OPERATED ACTUATING DEVICE FOR A MOTOR VEHICLE

CROSS-REFERENCE TO RELATED APPLICATION

This application claims priority to German Patent Application No. 10 2012 001 667.0, filed Jan. 28, 2012, which is incorporated herein by reference in its entirety.

TECHNICAL FIELD

The technical field relates to a cable-operated actuating device for a motor vehicle, a motor vehicle, in particular a passenger car, having such a cable-operated actuating device, and a method for actuating a cable control to such a cable-operated actuating device.

BACKGROUND

In motor vehicles, cable controls serve in particular for remote actuating. Thus, transmission shift levers can be coupled to a manual shift or automatic transmission via a cable control in order to shift the transmission by moving the shift lever. Goods, tank lids and the like can also be locked and/or unlocked through cable controls.

During the vehicle assembly, the cable control has to be connected to the actuating means, for example, the transmission shift lever.

At least one object herein is to improve this connecting. In addition, other objects, desirable features and characteristics will become apparent from the subsequent summary and detailed description, and the appended claims, taken in conjunction with the accompanying drawings and this background.

SUMMARY

According to an exemplary embodiment, a cable-operated actuating device includes an actuating means having a recess for inserting a coupling connector of a cable control. In an embodiment, it comprises one or more rotation and/or displacement degrees of freedom, wherein an actuation of the actuating means is to bring about a corresponding displacement of the cable control in order, for example, to shift a transmission. In a further embodiment, the actuating means comprises a transmission shift lever.

The actuating means can be in one or more parts. In an embodiment, the recess can be arranged in a component, in the following designated blocking means mounting, which is connected to a shift lever in a fixed manner, in particular formed integrally, or, connected in particular, in an articulated manner. An articulated connection can advantageously convert in particular a rotary movement of a shift lever into a pulling movement of the cable control.

The coupling connector of the cable control is, for example, introducible in the recess, which in an embodiment guides the coupling connector in an axially displaceable manner and/or fixes the coupling connector in a radial direction. Because of this, a more solid fastening of the cable control can be advantageously realized.

In an embodiment, the cable-operated actuating device comprises a blocking means, which is radially displaceable in the recess. In another embodiment, the blocking means is substantially designed block or log-like and, for example, comprises at least two, in particular four or more guiding faces, which together with corresponding mating faces of the recess, radially guide the blocking means in the recess. Additionally or alternatively, the blocking means can also be non-positively guided radially displaceably, for example through springs, and/or in a housing of the cable-operated actuating device.

In a radially outer position, the blocking means permits an axial displacing of the coupling connector in the recess, for example an axial inserting of the coupling connector in the recess. In a radially inner position, by contrast, it fixes the coupling connector in a positive and/or frictional connection against an inserting direction. Positive fixing here is to mean in particular a one or two-sided or unidirectional or bidirectional fixing with or without play, in particular therefore a stop, which counteracts an axial displacing in and/or against a direction.

To this end, one of the blocking means and the coupling connector can comprise one or more recesses, in particular grooves, and the other of the blocking means and the coupling connector, one or more corresponding protrusions, in particular ring flanges, which engage in the groove(s) and thus positively fix blocking means and coupling connector axially with or without play. In particular, the coupling connector can comprise an external thread, the blocking means a corresponding mating toothing.

In an exemplary embodiment, the coupling connector is fixed through the blocking means in different axial positions relative to the recess. This can for example take place positively, in that a protrusion optionally engages in different recesses or optionally different protrusions engage in a recess. Equally, this can take place through a frictional connection, in that a friction face of the blocking means and a friction face of the coupling connector are pressed against one another in the radially inner position of the blocking means.

In an embodiment, the cable-operated actuating device comprises a housing, which receives a connecting point between the coupling connector and the recess. In another embodiment, the coupling connector and/or the recess or the blocking means mounting are completely received in the housing.

In a further embodiment, the cable-operated actuating device comprises an actuating means, through which the blocking means can be radially displaced and which can be actuated from the outside or outside the housing.

Because of this, the blocking means can be advantageously actuated in an assembled state of the motor vehicle by a fitter from the inside without tools and the coupling connector axially fixed in the recess and thus the cable control fastened to the cable-operated actuating device. This axial fixing can take place, for example, during the final assembly, maintenance or the like of the motor vehicle and, for example through any person, such as a fitter, mechanic or vehicle owner who are collectively designated fitter here.

To this end, according to an embodiment, the coupling connector is inserted in the recess. Before, parallel to or following this, the actuating means is positioned in a predetermined position in which the cable control should have a present length or the present pullout. For example, a transmission shift lever can be brought into a designed shifting position in which it is to be connected to the cable control. In this way, production and assembly tolerances, cable stretching and the like can be compensated or calibrated and the cable pullout adjusted. After this, the actuating means is actuated outside the housing, for example, without tools and the coupling connector thus axially fixed through the blocking means.

In an embodiment, the actuating means can be designed in particular as a button, pushbutton, lever or the like, which protrudes out of the housing, for example, its upper side. Because of this, it can be easily reached and actuated by the fitter. In an embodiment, the actuating means is guided in a radially displaceable manner on the housing. In an embodiment, a button or pushbutton has a lateral surface, for example with circular cross section, which slides in an opening of the housing with complementary cross section. In an exemplary embodiment, the actuating means is aligned with the blocking means in radial direction.

In another embodiment, the actuating means is elastically preloaded against a displacing to radially inside of the blocking means, for example through a compression spring, which in a further embodiment surrounds a lateral surface of the blocking means and for example supports itself on a ring flange of the blocking means and/or an outside, such as the upper side of the housing. Because of this, the blocking means is advantageously held unloaded in a non-actuated, radially outer position.

The blocking means, for example in the radially inner position, can engage in the blocking means mounting and be radially fixed in this way. In an embodiment, the cable-operated actuating device comprises a retainer which is axially displaceably guided—for example on the blocking means mounting and/or the housing, in a further embodiment, is secured against rotation or is rotationally fixed. In a corresponding axial position, the retainer positively fixes the blocking means in a radial direction in the radially inner position. For example, the retainer can engage about the blocking means mounting and—at least partially—be pushed over the recess in order to radially fix the blocking means in the recess. In an embodiment, the retainer comprises a through-opening, the cross section of which corresponds to an outer contour of the blocking means mounting, for example with a clearance fit. When in an embodiment the blocking means mounting has an at least substantially circular cross section, the retainer can correspondingly have a circular through-bore, wherein then for a rotationally fixed guiding, one or a plurality of protrusions can advantageously engage in one of the retainer and the blocking means mounting in corresponding axial grooves in the other one of the retainer and the blocking means mounting. If the blocking means mounting, by contrast, has a non-rotation-symmetrical cross section, the retainer can be secured against rotation even by a through-opening that is complementary thereto.

In another embodiment, the retainer separates the actuating means and the blocking means from each other, when the blocking means is located in the radial inner position. For example, the retainer can be arranged—at least partially—between the actuating means and the blocking means, when this is located in the radially inner position. Because of this it can be checked in particular if the retainer is located in the corresponding position, radially securing the blocking means. For upon renewed actuation of the actuating means, the latter is counteracted only by the retainer. The fitter haptically and/or visually recognizes that he can no longer (completely) actuate the actuating means. Generally, in an embodiment, actuating and blocking means are separate components, which are not connected to each other.

In an embodiment, an elastic actuating means axially preloads the retainer against the blocking means. In this way, the retainer automatically slides over the blocking means as soon as the latter has been adequately displaced radially, thus no longer blocking the retainer. The elastic actuating means can in particular comprise a compression spring, which in an embodiment surrounds the blocking means mounting.

In another embodiment, an axial blocking of the retainer by the blocking means is obsolete upon a maximum actuating travel of the actuating means in the direction of the radially inner position of the blocking means, which for example can be predetermined by a mechanical stop or a going-solid of a spring preloading the actuating means. When the actuating means is adequately, maximally actuated, for example radially pressed into the housing, and because of this the blocking means radially displaced, the blockage of the retainer is cancelled, the retainer slides over the blocking means, radially fixing the latter.

In an embodiment the retainer, which slides between actuating means and blocking means, radially pushes the actuating means outward in the process. This provides the fitter with a haptic and/or visual feedback that the retainer has been activated. In particular, a forced guide can be provided for this purpose, which lifts the actuating means against its actuating direction as a result of an axial displacement of the retainer. A forced guide can for example comprise a running-up slope on one of the retainer and the blocking means, which converts an axial displacement of the contact faces of retainer and actuating means into a radial displacement of the actuating means.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
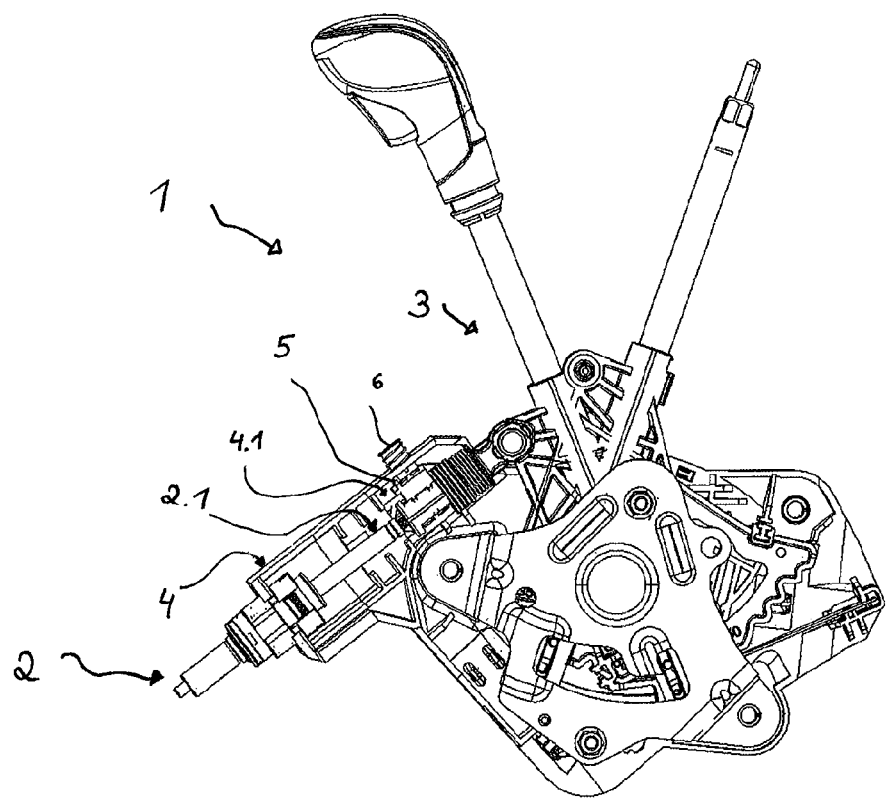
FIG. 1 is a lateral view of a cable-operated actuating device according to an exemplary embodiment.
Figure 2:
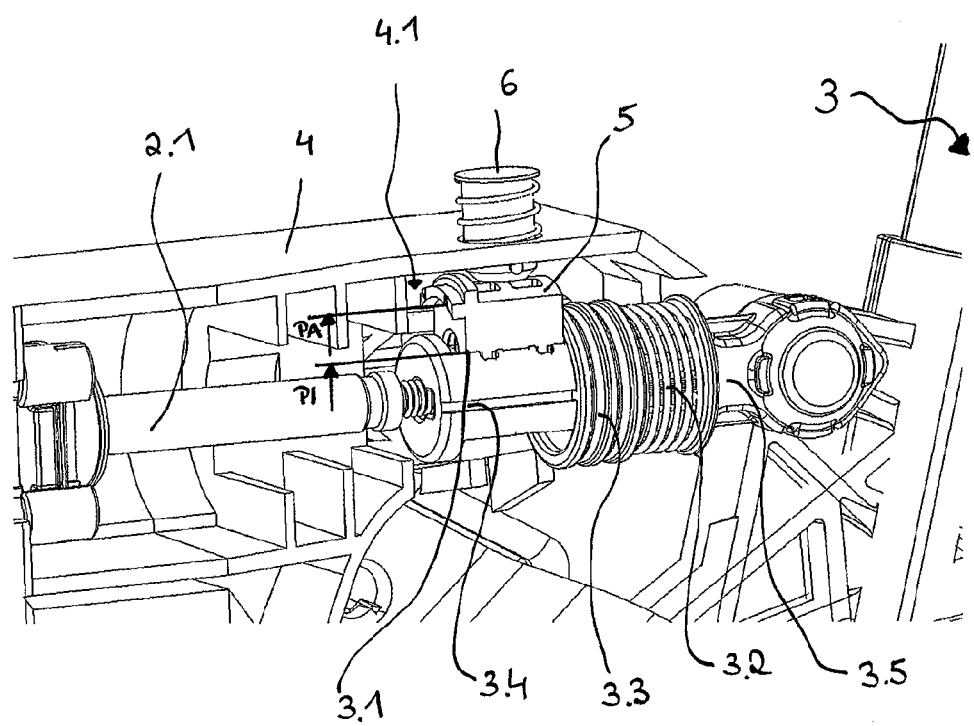
FIG. 2 is an enlarged, perspective view of a part of the cable-operated actuating device of FIG. 1.

FIGS. 1 and 2 show a cable-operated actuating device 1 according to an exemplary embodiment in the form of an automatic transmission shifting device. This comprises an actuating means in the form of a transmission shift lever 3, which is rotatably mounted in a housing 4. A blocking means mounting 3.5 is connected to the transmission shift lever 3 in an articulated manner, which blocking means mounting 3.5 comprises a recess 3.1 for axially inserting a coupling connector in the form of a threaded rod 2.1 of a cable control 2.

In an embodiment, in the recess 3.1, a block or log-like blocking means 5 is displaceably guided radially. In a radially outer position PA which is shown in FIGS. 1 and 2, the blocking means 5 permits an axial displacing of the coupling connector 2.1 in the recess 3.1, in particular an axial inserting of the coupling connector 2.1 in the recess 3.1 at a connecting point 4.1. In a radially inner position PI, indicated in FIG. 2, the blocking means 5 positively fixes the coupling connector 2.1 axially against an inserting direction. To this end, the blocking means 5 comprises a corresponding mating toothing to the thread of the threaded rod 2.1. This advantageously makes it possible to fix the coupling connector 2.1 in different axial positions in the recess 3.1.

In another embodiment, the cable-operated actuating device 1 comprises an actuating means in the form of a pushbutton 6, through which the blocking means 5 can be radially displaced, and which can be actuated outside the housing 4, since it protrudes from the upper side of the housing 4. A compression spring surrounds the cylindrical lateral surface of the pushbutton 6 and supports itself on a ring flange of the pushbutton 6 and an upper side of the housing 4.

In a further embodiment, the cable-operated actuating device 1 comprises an annular retainer 3.3, which, through a guide 3.4 in the form of a pin which axially slides in an axial groove is guided on the blocking means mounting 3.5 in an axially displaceable and rotationally fixed manner. An elastic actuating means in the form of a compression spring 3.2 axially preloads the retainer 3.3 against the blocking means 5, which blocks its axial displacement for as long as it is not located in its radially inner position PI.

The pushbutton 6 is secured against being pushed out of the housing 4 by two pins. In the opposite direction, its maximum actuating travel is predetermined by a going-solid of the compression spring surrounding it.

Pushbutton 6 and retainer 3.3 comprise complementary running-up slopes, which convert an axial displacement of the retainer into a radial displacement of the pushbutton 6 to radially outside.

In an embodiment, the cable control 2 is fastened to the cable-operated actuating device 1 as follows:

Initially, the coupling connector 2.1 is axially inserted in the recess 3.1, to this end, the blocking means 5 is in the radially outer position PA, which is shown in FIGS. 1 and 2.

Before, during, or following this, the transmission shift lever 3 is put into a desired position, which should correspond to the pullout of the control cable 2.

A fitter now actuates the pushbutton 6 by pressing it into the housing 4 against the compression spring surrounding it. This takes place without tools. Here, a mating toothing engages in the lower side of the blocking means 5 (not visible in FIGS. 1 and 2) in the outer thread of the threaded rod 2.1, thus fixing it in the desired axial position.

As soon as the pushbutton 6 has pushed the blocking means 5 radially deep enough into the radially inner position PI, the compression spring 3.2 pushes the annular retainer 3.3, which up to then was blocked by the blocking means 5, over the pushed-in blocking means 5 or the recess 3.1. In the process, it separates blocking means 5 and pushbutton 6 from each other and presses the pushbutton 6 radially to the outside. This imparts the fitter with a haptic and visual feedback that the retainer 3.3 has been activated, has shifted axially and now secures the blocking means 5 radially from sliding out.

The fitter can check the radial retaining by the retainer 3.3 in that he again actuates the pushbutton 6 after the sliding out. Since the retainer 3.3 now separates pushbutton 6 and blocking means 5, the pushbutton can no longer be pressed in so deeply, which indicates the correct seating of the retainer 3.3.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

The invention claimed is:

1. A cable-operated actuating device for a motor vehicle, the cable-operated actuating device comprising:
   a shift lever for axially displacing a blocking means mounting with a recess for inserting a coupling connector of a cable control;
   a blocking means that is radially displaceable in the recess and in a radially outer position permits an axial displacing of the coupling connector in the recess and in a radially inner position axially fixes the coupling connector against an inserting direction in a positive connection and/or frictional connection manner;
   an axially displaceable retainer for a positive-connection fixing of the blocking means in the radial inner position in a radial direction;
   a housing that houses the blocking means and a connecting point between the coupling connector and the recess, and
   an actuator for radially displacing the blocking means, wherein the actuator is actuated outside the housing to engage the blocking means through the housing in the radially outer position and to disengage the blocking means in the radially inner position,
   wherein the actuator is disabled after the blocking means is in the radially inner position.

2. The cable-operated actuating device according to claim 1, wherein the axially displaceable retainer separates the actuator and the blocking means when the blocking means is located in the radial inner position.

3. The cable-operated actuating device according to claim 1, further comprising an elastic actuating means for axially preloading the axially displaceable retainer against the blocking means.

4. The cable-operated actuating device according to claim 1, further comprising a forced guide that lifts the actuator as a result of an axial displacement of the axially displaceable retainer against an actuating direction.

5. The cable-operated actuating device according to claim 1, wherein the actuator protrudes from the housing.

6. The cable-operated actuating device according to claim 1, wherein the actuator is elastically preloaded against a displacing of the blocking means to radially inside.

7. The cable-operated actuating device according to claim 1, wherein the actuator is displaceably guided on the housing radially.

8. A motor vehicle comprising:
   a cable control with a coupling connector, and
   a cable actuating device comprising:
      a shift lever for axially displacing a blocking means mounting with a recess for inserting the coupling connector of the cable control;
      a blocking means that is radially displaceable in the recess and in a radially outer position permits an axial displacing of the coupling connector in the recess and in a radially inner position axially fixes the coupling connector against an inserting direction in a positive connection and/or frictional connection manner;
      an axially displaceable retainer for a positive-connection fixing of the blocking means in the radial inner position in a radial direction;

a housing that houses the blocking means and a connecting point between the coupling connector and the recess, and an actuator for radially displacing the blocking means, wherein the actuator is actuated outside the housing to engage the blocking means through the housing in the radially outer position and to disengage the blocking means in the radially inner position, wherein the actuator is disabled after the blocking means is in the radially inner position.

9. The motor vehicle according to claim 8, wherein the coupling connector is fixed by the blocking means in different axial positions relative to the recess.

10. A method for fastening a cable control to a cable-operated actuating device of a motor vehicle, the cable control comprising a coupling connector and the cable-operated actuating device comprising:

a shift lever for axially displacing a blocking means mounting with a recess for inserting the coupling connector of the cable control;

a blocking means that is radially displaceable in the recess and in a radially outer position permits an axial displacing of the coupling connector in the recess and in a radially inner position axially fixes the coupling connector against an inserting direction in a positive connection and/or frictional connection manner;

an axially displaceable retainer for a positive-connection fixing of the blocking means in the radial inner position in a radial direction;

a housing that houses the blocking means and a connecting point between the coupling connector and the recess, and an actuator for radially displacing the blocking means, wherein the actuator is actuated outside the housing to engage the blocking means through the housing in the radially outer position and to disengage the blocking means in the radially inner position, wherein the actuator is disabled after the blocking means is in the radially inner position, the method comprising the steps of:

inserting the coupling connector in the recess;

positioning the transmission shift lever; and actuating the actuator.

11. The method according to claim 10, wherein the actuator is again actuated for verification.

12. The cable-operated actuating device according to claim 1, wherein the cable-operated actuating device is for a transmission of a motor vehicle.

13. The motor vehicle according to claim 8, wherein the motor vehicle is a passenger car.

\* \* \* \* \*